United States Patent
Erban

(10) Patent No.: US 10,054,066 B2
(45) Date of Patent: Aug. 21, 2018

(54) METHOD FOR CONTROLLING AN ENGINE

(71) Applicant: ROBERT BOSCH GMBH, Stuttgart (DE)

(72) Inventor: Andreas Erban, Loechgau (DE)

(73) Assignee: ROBERT BOSCH GMBH, Stuttgart (DE)

( * ) Notice: Subject to any disclaimer, the term of this patent is extended or adjusted under 35 U.S.C. 154(b) by 403 days.

(21) Appl. No.: 14/375,652

(22) PCT Filed: Jan. 16, 2013

(86) PCT No.: PCT/EP2013/050722
§ 371 (c)(1),
(2) Date: Jul. 30, 2014

(87) PCT Pub. No.: WO2013/113554
PCT Pub. Date: Aug. 8, 2013

(65) Prior Publication Data
US 2015/0025782 A1    Jan. 22, 2015

(30) Foreign Application Priority Data

Jan. 30, 2012  (DE) .......................... 10 2012 201 241

(51) Int. Cl.
*G05B 19/414*  (2006.01)
*B60L 15/20*  (2006.01)
(Continued)

(52) U.S. Cl.
CPC ............ *F02D 28/00* (2013.01); *B60L 3/0092* (2013.01); *B60L 15/20* (2013.01); *B60W 10/08* (2013.01);
(Continued)

(58) Field of Classification Search
CPC ..... G05B 19/042; G05B 19/414; B60L 15/20; F02D 41/266; F02D 2041/285; B60W 10/08; B60W 30/02
(Continued)

(56) References Cited

U.S. PATENT DOCUMENTS

| 5,248,922 A | 9/1993 | Meshkat |
| 6,028,402 A * | 2/2000 | Kumar .................... B60L 3/102 |
| | | 180/197 |

(Continued)

FOREIGN PATENT DOCUMENTS

| CN | 1890464 A | 1/2007 |
| CN | 102398590 A | 4/2012 |

(Continued)

OTHER PUBLICATIONS

International Search Report for PCT/EP2013/050722, dated May 29, 2013.

*Primary Examiner* — Erick Solis
(74) *Attorney, Agent, or Firm* — Norton Rose Fulbright US LLP; Gerard Messina

(57) ABSTRACT

A device for controlling an engine includes: a first control circuit having a first controller, and a second control circuit having a second controller, the controllers being designed to control a state variable of the engine in each case. The second controller is disposed in such a way that it lies closer to the engine than the second controller in terms of signal technology.

18 Claims, 1 Drawing Sheet

(51) Int. Cl.
  *B60W 10/08* (2006.01)
  *F02D 28/00* (2006.01)
  *G05B 19/042* (2006.01)
  *B60L 3/00* (2006.01)
  *F02D 29/02* (2006.01)

(52) U.S. Cl.
  CPC ......... *F02D 29/02* (2013.01); *G05B 19/0421* (2013.01); *G05B 19/414* (2013.01); *G05B 19/4148* (2013.01); *B60L 2210/40* (2013.01); *B60L 2240/12* (2013.01); *B60L 2240/421* (2013.01); *B60L 2240/423* (2013.01); *B60L 2240/461* (2013.01); *B60L 2270/145* (2013.01); *G05B 2219/41003* (2013.01); *G05B 2219/42091* (2013.01); *G05B 2219/42247* (2013.01); *Y02T 10/642* (2013.01); *Y02T 10/7241* (2013.01); *Y02T 10/7258* (2013.01)

(58) Field of Classification Search
  USPC ........... 701/102, 114, 115; 180/65.1, 65.285, 180/65.51, 60, 216, 242; 290/9, 45
  See application file for complete search history.

(56) References Cited

U.S. PATENT DOCUMENTS

| | | | | |
|---|---|---|---|---|
| 7,228,842 B2* | 6/2007 | Kato | ................... | F02D 11/105 123/396 |
| 7,235,963 B2* | 6/2007 | Wayama | ............... | F02D 11/106 324/117 H |
| 7,922,616 B2* | 4/2011 | Manken | ................... | B60L 11/14 180/65.28 |
| 8,914,223 B2* | 12/2014 | Hernier | ................... | B60K 6/48 180/65.28 |
| 9,126,583 B2* | 9/2015 | Tsuchikawa | .............. | B60K 6/48 |
| 2002/0193935 A1* | 12/2002 | Hashimoto | ........... | F02D 11/105 701/110 |
| 2003/0144773 A1* | 7/2003 | Sumitomo | ............. | B60K 6/442 701/22 |
| 2003/0221670 A1* | 12/2003 | Wayama | ............... | F02D 11/106 123/399 |
| 2005/0203679 A1* | 9/2005 | Hisada | .................. | B60K 6/445 701/22 |
| 2005/0203680 A1* | 9/2005 | Hisada | .................. | B60K 6/445 701/22 |
| 2006/0293831 A1* | 12/2006 | Yano | .................... | F02D 11/107 701/114 |
| 2011/0000722 A1* | 1/2011 | Kawashima | ........... | B60K 6/485 180/65.28 |
| 2012/0059538 A1* | 3/2012 | Morris | .................. | B60W 10/08 701/22 |
| 2014/0094342 A1* | 4/2014 | Kobayashi | ............... | B60K 6/48 477/5 |

FOREIGN PATENT DOCUMENTS

| | | |
|---|---|---|
| CN | 102548830 A | 7/2012 |
| DE | 44 23 464 | 1/1996 |
| DE | 100 65 237 | 7/2002 |
| DE | 101 45 517 | 4/2003 |
| EP | 2 223 821 | 9/2010 |

* cited by examiner

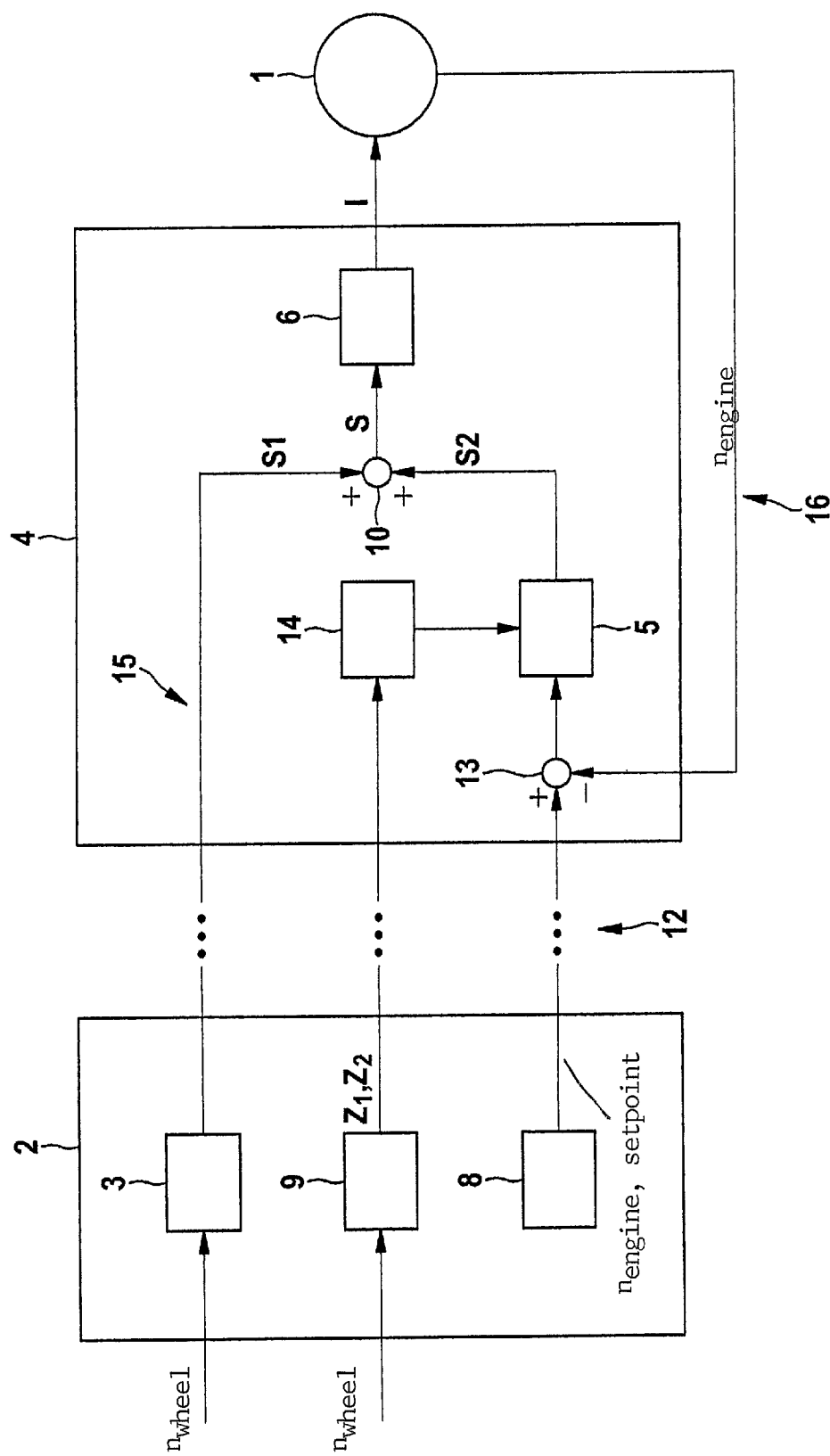

METHOD FOR CONTROLLING AN ENGINE

BACKGROUND OF THE INVENTION

1. Field of the Invention

The present invention relates to a device and a method for controlling an engine, which device includes two controllers.

2. Description of the Related Art

Known from the related art are combined engine controls which include both a torque and an engine speed controller. Such controls are used as traction controls for vehicle drives, for example. The control variable in combined control systems of this type is generated as a function of the signal variable output by the torque controller and as a function of the signal variable output by the engine speed controller. The two controllers are usually integrated in the particular control unit that is responsible for the electronic stability control (e.g., in the ESP control unit). Generally, this control unit is connected to an inverter, via a data bus such as the CAN bus and possibly via one or more interconnected control unit(s). The inverter uses the signal variables generated by the controllers to generate a corresponding control variable, such as a current in the case of an electric motor. Since the information exchange between the ESP control unit and the particular engine control unit may take a fairly long time in some instances, this leads to long signal propagation times or dead times, which may produce interfering control oscillations, especially in the control of electric motors.

BRIEF SUMMARY OF THE INVENTION

Therefore, it is the object of the present invention to produce a device for controlling an engine, especially an electric motor, which has shorter reaction times than known engine controls and generates fewer control oscillations.

According to the present invention, a device for controlling an engine such as an electric motor or an internal combustion engine is provided, which has a first control circuit including a first controller, and a second control circuit including a second controller, the controllers being designed to regulate a state variable of the engine in each case, such as the engine torque or the engine speed. In the present invention, the second controller is situated in such a way that it lies closer to the engine than the first controller in terms of signal technology. That is to say, the signal propagation times from the second controller to the engine are shorter than those from the first controller to the engine. As a result, at least the second controller can react faster to dynamic state changes of the engine, so that considerably fewer control oscillations arise overall.

The control device according to the present invention preferably includes a unit which forms a resulting signal variable as a function of a first signal variable output by the first controller and a second signal variable output by the second controller. The unit may include a summator, for example. The signal variables output by the first and second controller, or possibly also variables derived therefrom, are summed up in this case.

The first and second controller are preferably situated in such a way that the signal propagation time of the second signal variable to the unit is shorter than the signal propagation time of the first signal variable to the unit. In terms of signal technology, the second controller is therefore situated "closer" to the engine than the first controller, so that it has shorter response times.

According to one preferred specific embodiment of the present invention, the second controller is connected directly to the unit that forms the resulting signal variable. In other words, there is in particular no further signal-processing unit, such as a data bus or another control unit, between the second controller and the unit, but preferably only a simple data line. As a result, the signal propagation times in the control circuit of the second controller are considerably shorter than in the control circuit of the first controller.

In contrast, the first controller is connected to said unit preferably via at least one signal-processing unit such as a data bus and/or at least one interconnected control unit.

The control device according to the invention preferably includes an inverter, which uses the resulting signal variable to generate a control variable that is used to ultimately control the engine.

The first controller is preferably a torque controller, and the second controller is an engine speed controller.

According to one preferred specific embodiment of the invention, the first controller is integrated in a first control device and the second controller is integrated in a second control device. A control device is a structural electronic unit having a housing and multiple input and outputs.

The aforementioned unit for producing the resulting signal variable is preferably likewise integrated in the second control unit.

Furthermore, the inverter, too, is integrated in the second control unit.

The second control device is preferably post-connected to the first control device. At least one additional control device and/or a data bus, for example, may be interconnected between the first and second control device. A signal emitted by the first control device in this case is transmitted to the second control device via at least one further control device or via the data bus. The signal propagation times in the control circuit of the first controller are consequently longer than the signal propagation times of the second controller.

According to one special embodiment of the present invention, the control device furthermore includes a control unit which specifies in which control mode the control of the engine takes place as a function of a driving state. Specifiable as possible control modes are, for example, a pure torque control, a pure engine speed control, and/or a combined control that involves multiple controllers. In the case of a simple control, a controller such as the engine speed controller may be deactivated by the control unit. In the case of a combined control, the signal variables of all involved controllers are preferably considered when the resulting signal variable is formed.

The control amplification of the second controller may also be varied as a function of the driving state, e.g., as a function of the vehicle speed or the engine torque. This makes it possible to set an optimal control mode for different driving situations.

At low wheel slip—i.e., the vehicle is in a stable state —, a pure torque control preferably takes place. The engine speed controller is inactive in such a case, or its output signal is disregarded when the resulting signal variable is formed. If the wheel slip at at least one wheel exceeds a predefined threshold value, a combined control is preferably implemented. The control is therefore able to respond in a correspondingly rapid manner in critical driving situations. The individual signal variables output by the controllers are able to be weighted or considered differently depending on the driving state, e.g., the current wheel slip.

Said control unit for setting the control mode, or at least a portion thereof, is preferably integrated in the second control device.

The first controller is preferably integrated in a control device that is responsible for the dynamic stability control, e.g., in an ESP control device. The second controller is preferably integrated in another control device, which is situated closer to the engine in terms of signal technology.

According to one special development of the present invention, the control device includes a device for calculating the setpoint engine speed of the engine. This device is preferably accommodated in the particular control unit that accommodates the first controller as well.

Preferably, a data bus is used to transmit the calculated setpoint engine speed to the second control device, where a control differential is formed.

The present invention will be described in greater detail in the following text with the aid of the appended drawing. The FIGURE shows:

BRIEF DESCRIPTION OF THE DRAWING

FIG. 1 shows A block circuit diagram of a control device according to one specific embodiment of the present invention.

DETAILED DESCRIPTION OF THE INVENTION

FIG. 1 shows a block circuit diagram of a specific embodiment of a device according to the present invention for the control of an engine 1, in this case, an electric motor which drives the front axle of a vehicle, for example.

The control device in the present example includes two controllers 3, 5, i.e., a torque controller 3 and an engine speed controller 5, which control electric motor 1 as a function of the driving state either individually or jointly. At low wheel slip—the vehicle is in a stable state —, a pure torque control is preferably implemented. Engine speed controller 5 remains inactive in this case. In the event that the wheel slip at at least one wheel exceeds a predefinable threshold value, on the other hand, a combined control is preferably implemented, in which control variable I, which is the engine operating current in the case at hand, is formed while taking both controller output variables (signal variables $S_1$ and $S_2$) into account. The individual control mode is controlled by a control unit 14, which is connected to second controller 5 and is able to optionally activate or deactivate the latter or to modify its control amplification.

Torque controller 3 is part of a first control circuit 15, and the engine speed controller is part of a second control circuit 16.

The control device in the illustrated example includes two control devices 2 and 4, which are connected via a data bus 12 and thus are connected in series in terms of signal technology. Torque controller 3 is integrated in first control device 2, and engine speed controller 5 is integrated in second control device 4, in the form of software.

First control device 2 is preferably the particular control device that is responsible for the electronic stability control of the vehicle, such as the ESP control device.

If active, both controllers 3, 5 output a signal variable $S_1$ and $S_2$ at their respective outputs, which is transmitted to a unit 10 which uses signal variables $S_1$ and $S_2$ to form a resulting signal variable S. The controller outputs are thus connected to unit 10 in each case.

In the example at hand, unit 10 is a summator, which adds up the two signal variables $S_1$ and $S_2$. Resulting signal S is finally forwarded to an inverter 6, which converts it into a corresponding current value I.

Unit 10 and inverter 6 are integrated in control device 4, as is second controller 5. Control unit 14 is likewise situated in control device 4. The output of inverter 6 is connected to electric motor 1.

Torque controller 3 ascertains first signal variable $S_1$ as a function of a previously determined setpoint torque $M_{setpoint}$ and an actual engine torque. The individual torques are calculated in the known manner while taking wheel speeds $n_{wheel}$ into account. Wheel speeds $n_{wheel}$ are measured with the aid of rate-of-rotation sensors (not shown).

Engine speed controller 5 ascertains second signal variable $S_2$ as a function of a previously determined setpoint engine speed $n_{eng,setpoint}$ and a measured actual engine speed $n_{eng}$. Setpoint engine speed $n_{eng,setpoint}$ of the motor is calculated with the aid of a device 8 which is included in first control device 2. It is ultimately transmitted to second control device 4 via data bus 12.

The setpoint engine speed $n_{eng,setpoint}$ may be calculated according to the following equation, for example:

$$n_{eng,setpoint} = \frac{30}{\pi} \frac{i_D i_G}{r_{wheel}} v_{wheel,setpoint}$$

where
$i_D$ is the translation of a differential gear of the vehicle,
$i_G$ is the translation of the vehicle transmission coupled to electric motor 1,
$r_{wheel}$ denotes the radius of the driven wheels, and
$v_{wheel,setpoint}$ denotes an average setpoint speed of the driven wheels.

To form the control difference for the engine speed control, a unit 13 is provided, which in this case is integrated in second control device 4. The control difference is subsequently output to engine speed controller 5. Engine speed controller 5 may be a PDT1 controller, for example. The control amplifications for the P and D component can be selected as a function of the vehicle speed and/or the average engine torque, for example.

To determine the control mode, a control unit 14 is provided, as previously mentioned, which sets the control mode as a function of the driving state. The driving state is monitored by a unit 9 in this case, which outputs a variable that describes the driving state, e.g., $Z_1$ or $Z_2$, to control unit 14 via data bus 12. Unit 9 determines the current wheel slip of the driven wheels, for instance, and generates a signal $Z_1$ when the wheel slip is smaller than a predefined threshold value, that is to say, when the vehicle is in a stable driving state, and a signal $Z_2$ when the wheel slip is greater than a predefined threshold value, which means that the vehicle is in an unstable driving state.

In the stable driving state, a pure torque control is preferably implemented. In the unstable driving state, on the other hand, a combined control is carried out, in which both controllers 3, 5 participate. Because the reaction times in engine speed control circuit 16 are considerably lower than in torque control circuit 15, a more rapid reduction of the control deviation is achieved overall, and fewer control oscillations arise in the control circuit in addition.

What is claimed is:
1. A system for controlling an electric motor of a vehicle, the system comprising:

a first control device which includes a first controller to control a torque of the electric motor, the first controller outputting a first signal variable to a data bus as a function of an actual torque of the electric motor and a setpoint torque; and
a second control device connected downstream from the first control device via the data bus, the second control device receiving the first signal variable over the data bus and including:
a second controller to control a speed of the electric motor, the second controller generating a second signal variable as a function of an actual speed of the electric motor and a setpoint speed; and
a unit which forms a resulting signal variable as a function of the first and second signal variables;
wherein the second controller is situated closer to the electric motor than the first controller in terms of signal technology.

2. The system as recited in claim 1, wherein the first control device and the second control device are disposed in such a way that a signal propagation time of the second signal variable to the unit is shorter than a signal propagation time of the first signal variable to the unit.

3. The system as recited in claim 1, wherein the second controller is directly connected to the unit.

4. The system as recited in claim 1, further comprising an inverter which generates a control variable as a function of the resulting signal variable, wherein the control variable is used to control the electric motor.

5. The system as recited in claim 1, wherein the unit which forms the resulting signal variable is a control unit which specifies, as a function of a driving state of the vehicle, one of at least two different control modes in which the control of the electric motor is implemented.

6. The system as recited in claim 1, wherein the unit is configured to selectively implement a pure torque control as a function of a driving condition of the vehicle by generating the resulting signal variable as a function of the first signal variable but not the second signal variable.

7. The system as recited in claim 6, wherein the unit implements the pure torque control in response to a wheel slip of the vehicle being below a predetermined threshold.

8. The system as recited in claim 1, wherein the unit is configured to selectively implement a pure speed control as a function of a driving condition of the vehicle by generating the resulting signal variable as a function of the second signal variable but not the first signal variable.

9. The system as recited in claim 1, wherein the unit is configured to selectively implement a combined torque and speed control as a function of a driving condition of the vehicle by generating the resulting signal variable as a function of both the first signal variable and the second signal variable.

10. The system as recited in claim 9, wherein the unit implements the combined torque and speed control in response to a wheel slip of the vehicle being above a predetermined threshold.

11. A method for controlling an electric motor of a vehicle, the method comprising:
generating a first signal for use in controlling a torque of the electric motor using a first controller of a first control device, the first signal variable being a function of an actual torque of the electric motor and a setpoint torque, and outputting the first signal variable to a data bus;
generating a second signal for use in controlling a speed of the electric motor using a second controller of a second control device connected downstream from the first control device via the data bus, the second signal variable being a function of an actual speed of the electric motor and a setpoint speed, the second control device receiving the first signal variable over the data bus; and
forming a resulting signal variable as a function of the first and second signal variables using a unit of the second control device,
wherein the second controller is situated closer to the electric motor than the first controller in terms of signal technology.

12. The method as recited in claim 11, wherein the first and second controllers are disposed in such a way that a signal propagation time of the second signal to the unit is shorter than a signal propagation time of the first signal to the unit.

13. The method as recited in claim 11, further comprising generating a control variable to control the electric motor as a function of the resulting signal variable using an inverter.

14. A device for controlling an electric motor of a vehicle, the device comprising:
a controller to control a speed of the electric motor, the controller generating a signal variable as a function of an actual speed of the electric motor and a setpoint speed; and
a unit which forms a resulting signal variable as a function of the signal variable and an additional signal variable that the device receives over a data bus from an additional device, connected upstream from the device via the data bus, having an additional controller to control a torque of the electric motor, the additional signal variable being a function of an actual torque of the electric motor and a setpoint torque,
wherein the controller is configured to be situated closer to the electric motor than the additional controller in terms of signal technology.

15. The system as recited in claim 1, wherein the first control device is an electronic stability program control device.

16. The system as recited in claim 1, wherein the unit is a summation unit to form a resulting signal variable as a function of the first and second signal variables, and the system further comprises an inverter to generate a current signal as a function of the resulting signal variable to control the electric motor.

17. The system as recited in claim 16, wherein the inverter is disposed in the second control device.

18. The device as recited in claim 14, wherein the control device and the additional control device are disposed in such a way that a signal propagation time of the signal variable to the unit is shorter than a signal propagation time of the additional signal variable to the unit.

* * * * *